United States Patent [19]

Angelini

[11] 3,979,317
[45] Sept. 7, 1976

[54] VOLATILE CLEANING SOLUTION FOR PHOTORECEPTORS

[75] Inventor: Dominic J. Angelini, Webster, N.Y.

[73] Assignee: Xerox Corporation, Stamford, Conn.

[22] Filed: Apr. 28, 1975

[21] Appl. No.: 572,038

[52] U.S. Cl. .............................. 252/170; 252/162; 252/DIG. 10; 134/4; 134/38; 355/15; 15/100; 134/6
[51] Int. Cl.$^2$ ............................................ C09D 9/04
[58] Field of Search ............. 252/170, 162, DIG. 10; 134/4, 6, 38; 355/15; 15/100

[56] References Cited
UNITED STATES PATENTS

| | | | |
|---|---|---|---|
| 3,095,381 | 6/1963 | Tinnon et al. | 252/170 |
| 3,702,303 | 11/1972 | Clemens et al. | 252/168 |
| 3,728,269 | 4/1973 | Stephenson et al. | 252/DIG. 10 |
| 3,867,170 | 2/1975 | Ferguson et al. | 134/6 |

FOREIGN PATENTS OR APPLICATIONS

| | | | |
|---|---|---|---|
| 650,520 | 10/1962 | Canada | 252/170 |

*Primary Examiner*—Mayer Weinblatt

[57] ABSTRACT

The photoreceptor cleaning composition is provided which includes a lower alcohol, ultrapure water and a surfactant, 3,5-dimethyl-1-hexyn-3-ol. This cleaning solution is 100% volatile, water-clear, and is found to contain no solids or colloidal matter, in addition to being contaminant- and particulate-free, it is found to leave no detectable residue even if not fully wiped off in a cleaning operation. The most significant property of this photoreceptor cleaning solution is its ability to retard crystallization of the photoreceptor, which has been found to be a major problem with many known photoreceptor cleaning solutions.

12 Claims, No Drawings

VOLATILE CLEANING SOLUTION FOR PHOTORECEPTORS

BACKGROUND OF THE INVENTION

This invention relates to cleaning compositions and more particularly to the cleaning of photoconductive insulating surfaces. More specifically, this invention relates to the cleaning of reusable electrophotographic plate belts or drums conventionally employed in the electrophotographic imaging process.

In an electrophotographic imaging process, for example, more specifically disclosed in Carlson U.S. Pat. No. 2,297,691, an electrophotographic plate comprising a photoconductive insulating material on a conductive backing is uniformly charged over its surface and then exposed selectively to produce a latent electrostatic image. Thereafter a latent electrostatic image is developed employing an electroscopic marking powder known in the art as toner normally employed in connection with a carrier to form a visible reproduction of the original employed. This development of the latent electrostatic image generally employs an electrostatically attractable material which is normally a thermoplastic resin in the form of finely divided particles usually in the range of from 3 to 20 microns. The toner is applied by bringing the photoconductive surface bearing the latent electrostatic image into contact with the powder, the charged areas normally retaining the toner particles. The developed image may then be transferred to a suitable support material such as paper and then fixed if desired by heating and/or application of a solvent or the like. In the transfer step substantially all of the resin material or toner adheres to support material to form the image thereon, but usually a very small percentage of the resin material or toner remains on the electrophotographic surface.

These trace amounts of resin material or toner remaining on the electrophotographic surface are found to affect future operating steps of the process, and if left to remain thereon, will provide an undesirable cumulative effect. Additional residual toner particles adhere more readily to the surface in both image and non-image areas and consequently image deterioration results. In automatic imaging machines employing rotary drums, continuous cleaning of such residual toner particles is effected with a rotating brush in peripheral contact with the surface of the electrophotographic surface which removes any residual resin material or toner adhering thereon. This brush in turn is cleaned by the use of a flicking bar in combination with a vacuum system whereby residual resin material or toner removed from the brush by the flicking bar is entrained in air and then subsequently separated from the air by a suitable filter.

Washing techniques have been employed to remove loosely held toner residue employing non-solvent liquids such as water, alcohols and mixtures thereof. However, residue toner which is firmly held by any means, e.g. chemical or non-chemical, is not effectively removed with these wash techniques. In addition, these wash substances contain alcohols in concentrations which are flammable. Liquids which are considered non-flammable are those which exhibit flash point at or above 140°F as described in Fundamentals of Industrial Hygiene published by the National Safety Council, 1971.

This continuous cleaning of the photoconductive insulating surface or other methods that may be employed in the art are not effective to completely remove the toner material from the photoconductive surface and, therefore, repeated use of the photoconductive insulating surfaces causes a thin film of the toner material to be formed thereon which adversely affects the reproduction process. In addition, the thin film of toner material is removed from the photoconductive surface of commercial machines by effecting periodic cleaning with a solvent which is generally flammable. Numerous attempts have been made to develop an effective cleaner for removing residual toner film from the photoconductive insulating surface but such attempts have generally been unsuccessful since they themselves have resulted in additional problems such as cleaner staining or spotting of the photosensitive layer, desensitizing the layer, crystallizing the layer, or otherwise interfering with the functional properties of the photoconductive layer or excessive toxicity especially the chlorinated solvents.

In U.S. Pat. No. 3,702,303 a composition for cleaning photoconductive insulating surfaces comprising an aqueous-organic liquid emulsion in a surfactant is disclosed. The composition recited may include an abrasive and a suspending agent and preferably includes a non-flammable organic liquid such as, for example, tetrachloroethylene which is emulsified in the water in an amount to control the volatility thereof and thereby provide a composition which evaporates from the surface to be cleaned at a rate that permits effective cleaning without producing solvent films or stains. However, the emulsifiers and possible abrasives employed leave residues which are not desirable in some applications and must be dry-wiped.

In addition, modern photoconductive members in some cases employ distinct alloy layers which vary in thickness and all of which are extremely thin, i.e. below 60 microns in thickness, and preferably are below 10 microns. it is readily found that any abrasion of the top layers or layer of these photoreceptors leads to an immediate and dramatic loss of panchromaticity and hence the photoreceptor is no longer suitable for use in a color imaging process. For example, the abrasion is normally experienced during the course of cleaning the photoreceptor surface of condensed toner polymer residue and paper tars as above explained. Normally this is caused by the presence of cleaning aids which are non-solvents for the polymer and paper tars and reliance on some pumicing action for cleaning. In addition to high flammability and the problems associated when employing compounds containing pumice, toxicity is also a very real factor in the environment in which these compositions are employed. This composition has very low toxicity.

In addition to the above problems, one of the more significant adverse effects of cleaning solutions is found to be crystallization in the case of selenium photoreceptors. This, of course, becomes a problem of major proportions since, crystallization of the selenium photoreceptor results in deterioration, if not destruction, of the photoconductive properties thereof and involves costly maintenance repairs and loss of machine time.

There is, therefore, a demonstrated need to provide improved cleaning compositions for photoreceptor surfaces.

It is, therefore, an object of this invention to provide a cleaning composition for photoreceptor surfaces devoid of the above noted deficiencies.

A further object of this invention is to provide a cleaning composition for cleaning photoreceptor insulating surfaces which retards and inhibits crystallization of selenium photoreceptors.

Another object of this invention is to provide a non-abrasive cleaning composition suitable for cleaning photoreceptor surfaces in automatic electrophotographic imaging machines.

Yet another object of this invention is to provide cleaning compositions which may have low toxicity so as to provide a safer environment for use than prior art cleaning compositions.

Yet again another object of this invention is to provide a novel cleaning composition which will not alter or affect the photoconductive properties of conventionally employed photoreceptors.

These and other objects of the instant invention are accomplished generally speaking by providing a photoreceptor cleaning composition comprising a lower alcohol, for example ethyl alcohol, water and a non-ionic surfactant, 3,5-dimethyl-1-hexyn-3-ol, sold under the Tradename of Surfynol 61 by Air Products and Chemicals, Inc.

This cleaning solution is 100% volatile, water-clear, and is found to contain no solids or colloidal matter, in addition to being contaminant and particulate free when properly filtered through, <0.1 μm absolute membrane filters and thus, is found to leave no detectable residue even if not fully wiped off in a cleaning operation. It is found to have a sufficiently low surface tension, lubricity, and other cleaning properties which may permit it to be used universally for cleaning all xerographic photoreceptors and is effective for all contaminants produced in these xerographic devices such as loose non-compacted toners, carriers, and silicone oil condensate among others.

Preferably, the components of the instant cleaning solution are provided in near absolute purity and freedom from particulates insofar as economically practicable; for example, the alcohol is 200 proof USP grade and the water is >10 megohm-cm, <0.1 μm absolute quality ultrafiltered.

However, the most significant property of this cleaning composition as above alluded to, is its ability, due to the presence of the Surfynol 61 surfactant, to actually retard and inhibit crystallization of photoreceptors, especially selenium-type photoreceptors after the cleaning operation. Though the chemical is completely volatilized, in effect it is believed to perform as a protective coating in this respect, lessening the susceptibility of photoreceptors to crystallization and subsequent image quality reduction from the effects of abrasion, heat, chemical vapors and other mechanisms.

In use the solution is primarily applied to the selenium-type photoreceptors after the photoreceptor has been developed and the image has been transferred. The solution is normally provided to be used in a pre-impregnated pad which is provided to be non-residue forming and non-abrasive. However, it may also be employed as a solution at the point of use with or without pads as required with any of the common dispensing systems. While the cleaning ingredients are completely volatile and relatively pure as well as the cleaning pad, and therefore, do not leave residues, spots or streaks in themselves, the photoreceptor being cleaned contains contaminants which will spot after being dislodged by the solution and pad and, therefore, must be removed before the solution is allowed to fully dry. The cleaning composition of the instant invention is found to have the necessary lubricating qualities required to accomplish this if the wiping pad process is employed.

Any suitable lower alcohol may be employed in the process of the instant invention. Typical lower alcohols include methanol, isopropyl or n-propyl alcohol and others. The lower alcohol employed may be present in any suitable ratio. However, generally the range of 30–90 parts of alcohol per 70–10 parts of water is employed and preferably 70–90 parts of lower alcohol to 30–10 parts of water and optimally, 80 parts of alcohol to 20 parts of water.

Although the water employed has been described as deionized, 18 megohm-cm quality, and ultrafiltered, any other suitable quality of water may be employed including distilled water of similar resistivity.

Any suitable ratio of surfactant may be employed in the composition of the instant invention, generally 0.1–50 parts of surfactant by volume per 100 parts of solution are employed while 0.5–5.0 parts of surfactant per 100 parts of solution are preferred, and one part surfactant per approximately 100 parts solution is optimal. The surfactant as described above is referred to as Surfynol 61 (3,5-dimethyl-1-hexyn-3-ol).

The cleaning solution thus provided is found to have a very low surface tension, for example, 25.5 dynes/cm compared with 72.9 dynes/cm for deionized water alone, when ethyl alcohol is the lower alcohol employed, enabling it to spread most surfaces and wet most contaminants encountered. The combination of, in the case of ethyl alcohol, water, and surfactant, is found to provide a much wider range of contaminant removal than commercially employed isopropanol cleaning solutions, in particular, with regard to removal of silicone oil condensates resulting from the use of this substance commonly as a paper release agent. Slightly slower evaporation characteristics provided by this solution allow more open working time for the removal of contaminants if a wiping process is employed. An advantage over commercially used film removers is the 100% essentially volatility due to higher purity and control over the chemical components and packaging employed.

As before stated, if a wiping pad process is employed, maximum efficiency of the solution is realized, since only enough solution is used at the point of contamination where it is needed. For example, 8–10 grams of solution may be employed per pad of which 4–5 grams is normally discarded which is sufficient for the largest photoreceptor encountered in conventional xerographic imaging machines. Virtually no possible spillage of the solution droplets can occur in tight quarter critical areas, such as toner areas if a pre-impregnated pad is used. In addition, higher efficiency is realized towards cleaning silicone oil/toner condensate, a relatively difficult to remove contaminant film, commonly encountered and one which cannot be removed by prior proprietary cleaning solutions. It is also found when employing the cleaning solution of the instant invention, that since greater cleanability is provided its usage in borderline contamination cases may eliminate the need for Brasso type cleaning which incorporate mild inert abrasives which may in some cases be undesirable. The cleaning solution also is found to possess very low toxicity from vapor inhalation and minimal skin contact effect due to the absence of grease solvent and minimal danger to eyes due to spillage if the pad concept is employed.

More significantly as before referred to, the cleaning solution of the instant invention differs dramatically from those of the prior art since it is found not to induce crystallization as prior art cleaning compositions do but as a matter of fact, to positively retard and inhibit crystallization of photoreceptors, for example, selenium-type commercial photoreceptors after the cleaning operation. Though the chemical as before stated, is completely volatilized, it in effect performs as a protective coating in this respect, lessening the susceptibility of photoreceptors to crystallization and subsequent image quality reduction. This is especially true with respect to conventional selenium alloy-type photoreceptors.

To further define the specifics of the present invention, the following examples are intended to illustrate and no limit the particulars of the present system. Parts and percentages are volume unless otherwise indicated.

EXAMPLE I

The cleaning solution of ethyl alcohol, 80 parts, water, >10 megohm-cm purity, 20 parts, and Surfynol 61, 1 part, is mixed, filtered and applied employing pads to a filmed selenium photoreceptor. The photoreceptor is found to be effectively and efficiently cleaned and in addition, after long periods of usage is found to be without crystallization.

EXAMPLE II

The process as defined in Example I is again performed with the exception that the following cleaning solution is employed: ethyl alcohol, USP grade (obtained from U.S.I. Industrial Chemical Co.), 80 parts, deionized water, >10 megohm-cm purity, 20 parts, and Surfynol 61, 5 parts.

EXAMPLE III

The process as defined in Example I is again performed with the exception that the following cleaning solution is employed: denatured alcohol, SDA No. 3A, 200 proof (obtained from U.S.I. Industrial Chemical Co.), 90 parts, deionized water, >10 megohm-cm purity, 10 parts, and Surfynol 61, 1 part.

EXAMPLE IV

The process as defined in Example i is again performed with the exception that the following cleaning solution is employed: denatured alcohol, SDA No. 30, 200 proof (obtained from U.S.I. Industrial Chemical Co.), 50 parts, deionized water, >megohm-cm purity, 50 parts, and Surfynol 61, 10 parts.

EXAMPLE V

The process as defined in Example I is again performed with the exception that the following cleaning solution is employed: denatured alcohol, anhydrous, reagent (J. T. Baker Chemical Co., denaturants being methyl alcohol, isopropanol), 30 parts, deionzied water, >10 megohm-cm purity, 70 parts, and Surfynol 61, 1 part.

EXAMPLE VI

The process as defined in Example I is again performed with the exception that the following cleaning solution is employed: 2-propanol, spectrophotometric grade, analyzed reagent (J. T. Baker Chemical Co.), 70 parts, deionized water, >10 megohm-cm purity, 30 parts, and Surfynol 61, 10 parts.

Although the present examples were specific in terms of conditions and materials used, any of the above listed typical materials may be substituted when suitable in the above examples with similar results. In addition to the steps used to carry out the process of the present invention, other steps or modifications may be used if desirable. In addition, other materials may be incorporated in the system of the present invention which will enhance, synergize, or otherwise desirably affect the properties of the systems for their present use.

Anyone skilled in the art will have other modifications occur to him based on the teachings of the present invention. These modifications are intended to be encompassed within the scope of this invention.

What is claimed is:

1. A method of cleaning insulating photoconductive photoreceptor surfaces comprising providing a filmed photoconductive insulating photoreceptor surface, applying a cleaning solution which consists essentially of a lower alcohol, water and 3,5-dimethyl-1-hexyn-3-ol surfactant, with the proviso that the ratio of said alcohol to said water is 30–90 parts of said alcohol per 70–10 parts said water and that said surfactant comprises 0.1–50 parts per 100 parts of said solution.

2. The method as defined in claim 1 wherein said lower alcohol is ethyl alcohol.

3. The method as defined in claim 1 wherein said water has a quality of to 10 megohm-cm resistivity and is ultrafiltered.

4. The process as defined in claim 1 wherein said alcohol consists of ethyl alcohol of 200 proof USP Grade.

5. The method as defined in claim 1 wherein said alcohol is present in 70–90 parts for 100 parts of total solution.

6. The method as defined in claim 1 wherein said surfactant is present in a range of from 0.5 parts of surfactant by volume to 100 parts of solution to 5.0 parts of surfactant to 100 parts of solution.

7. The method as defined in claim 1 wherein said filmed surface is filmed with material selected from the group consisting of toner polymer residue, paper tars and mixtures thereof.

8. The method as defined in claim 7 wherein said photoconductive insulating surface comprises selenium.

9. The method of claim 1 wherein said ratio of alcohol to water is 30–10 parts of said water per 70–90 parts of said alcohol and said surfactant comprises 0.5–5.0 parts of surfactant per 100 parts of said solution.

10. The method of claim 1 wherein said lower alcohol is selected from the group consisting of isopropyl, n-propyl and methanol.

11. A method of cleaning a selenium insulating photoconductive surface comprising providing a selenium surface filmed with material selected from the group consisting of toner polymer residue, paper tars and mixtures thereof, applying a cleaning solution consisting essentially of a lower alcohol, water and 3,5-dimethyl-1-hexyn-3-ol surfactant to said surface, with the proviso that the ratio of said alcohol to said water is 30–90 parts of said alcohol per 70–10 parts water and that said surfactant comprises 0.1–50 parts per 100 parts of said solution.

12. The method of claim 11 wherein said lower alcohol is selected from the group consisting of isopropyl, n-propyl and methanol.

* * * * *